United States Patent [19]

De Vaan

[11] Patent Number: 5,029,986

[45] Date of Patent: Jul. 9, 1991

[54] ELECTRO-OPTICAL COLOR DISPLAY DEVICE AND PROJECTION APPARATUS

[75] Inventor: Adrianus J. S. M. De Vaan, Eindhoven, Netherlands

[73] Assignee: U.S. Philips Corporation, New York, N.Y.

[21] Appl. No.: 323,470

[22] Filed: Mar. 14, 1989

[30] Foreign Application Priority Data

Apr. 13, 1988 [NL] Netherlands .................. 8800951

[51] Int. Cl.⁵ .................................... G02F 1/133
[52] U.S. Cl. ........................ 350/338; 350/339 F; 350/345
[58] Field of Search ............... 350/345, 339 F, 338

[56] References Cited

U.S. PATENT DOCUMENTS

| 4,678,285 | 7/1987 | Ohta et al. | 350/345 |
| 4,772,885 | 9/1988 | Uehara et al. | 350/345 |
| 4,793,691 | 12/1988 | Enomoto et al. | 350/345 |
| 4,798,448 | 1/1989 | Van Raalte | 350/339 F |
| 4,799,050 | 1/1989 | Prince et al. | 350/345 |
| 4,936,659 | 6/1990 | Anderson et al. | 350/345 |

FOREIGN PATENT DOCUMENTS 0159827  8/1985  Japan .................. 350/339 F

Primary Examiner—Stanley D. Miller
Assistant Examiner—Anita Pellman Gross
Attorney, Agent, or Firm—John C. Fox

[57] ABSTRACT

The light output of a color LCD (10) is considerably increased by arranging dichroic mirrors (31, 32, 33) register with the pixels (20), which mirrors pass the color suitable for the pixel and reflect the other colors so that they can be reflected back again by a reflective surface (45) and be used in the display.

14 Claims, 2 Drawing Sheets

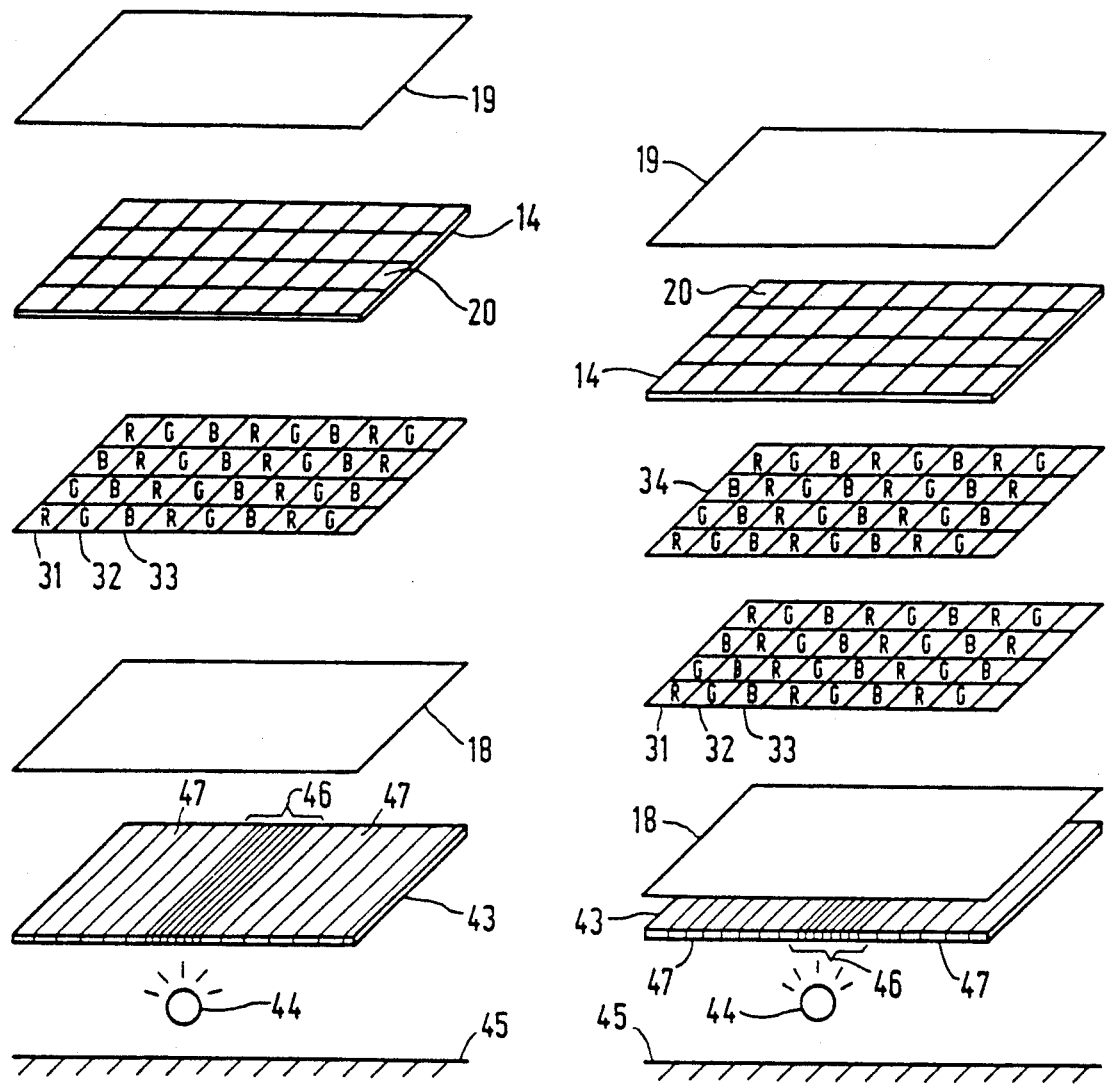
FIG.2  FIG.3
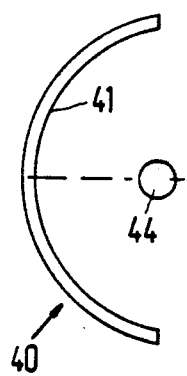
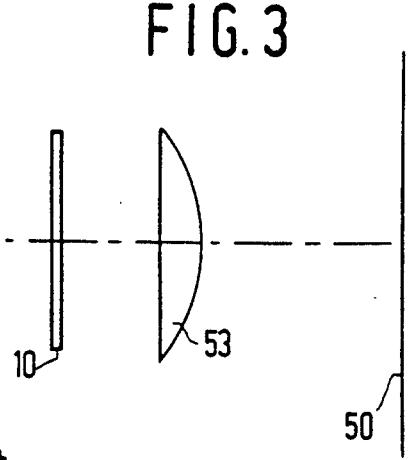
FIG.4

ELECTRO-OPTICAL COLOR DISPLAY DEVICE AND PROJECTION APPARATUS

BACKGROUND OF THE INVENTION

The invention relates to a display device, particularly a display device comprising an electro-optical medium between two transparent, parallel supporting plates provided with a pattern of pixels, said device having a light element.

The invention also relates to a display cell for use in such a display device.

Such display devices are used, for example, in (projection) colour television or in colour monitors for data display in computer systems or in display devices in dashboards, etc.

In British Patent Specification No. 2,154,355, a liquid crystal display device composed of a liquid crystalline material between two glass plates for operation in the transmission mode. The includes a pattern of UV-sensitive phosphors and means for separately switching areas associated with this pattern.

In operation, ultraviolet radiation emitted by a UV-source causes conversion in the luminescent layers to a colour in the visible part of the spectrum (for example to the primary colours red, green and blue), and that visible light is passed on or not passed on by the electro-optical medium according to (colour) picture information.

However, during this conversion a large part of the quantity of light generated in the phosphors is lost. In fact, the conversion is realized within a very thin layer (approximately 2 to 3 microns) on the side of the incident ultraviolet radiation.

To avoid the division into separate luminescent areas, a luminescent layer emitting uniformly distributed light is coated with a colour filter in another embodiment.

Apart from the aforementioned drawback of light absorption in the luminescent layer this solution, similarly as in conventional liquid crystal display devices of the transmission type, has the drawback that the greater part of the light is absorbed in the colour filters. When using an RGB-pattern (red-green-blue) a red filter will pass the greater part of the red light, but will absorb the blue and the green light. Similar remarks apply to blue and green filters. This imposes stringent requirements on the light source in conventional devices.

OBJECTS AND SUMMARY OF THE INVENTION

It is an object of the invention to obviate these drawbacks to a substantial extent.

According to the invention, a device of the type described in the opening paragraph is characterized in that the light element can emit a light spectrum and in that the device, registering with the pixels, comprises a pattern of dichroic mirrors which substantially pass one part of the light spectrum associated with corresponding pixels and substantially reflect the other part in the direction of an element reflecting in such a way that the reflected light is reflected in the direction of the pixels.

The pixels may be defined with the aid of picture electrodes arranged on one supporting plate, while the other supporting plate comprises a continuous electrode or electrode paths. The pixels may also be defined by the region where electrode paths on the one supporting plate cross the electrode paths on the other supporting plate, usually in mutually perpendicular directions.

The invention is at least partly based on the recognition that light which is not passed is not absorbed in the display cell but is reflected and can be passed through the display cell again after reflection (for instance in the light element).

This enhances the light output when using the same light source. Moreover, substantially no light is absorbed in the colour-selecting layer (in this case the dichroic mirrors) so that there is less heating of the display cell, which is very favourable, notably for use in projection TV.

Finally, no special requirements need to be imposed on the wavelength(s) of the light emitted by the light source, as described in British Patent Specification No. 2,154,355.

A preferred embodiment of a display device according to the invention is characterized in that the device comprises a colour filter which is divided into colour filter elements registering with the dichroic mirrors and the pixels, the colours of the filter elements corresponding to the colour passed by the associated dichroic mirrors.

A display cell for use in a display device according to the invention is characterized in that the display cell, registering with the pixels, comprises a pattern of dichroic mirrors which, dependent on their position in the pattern, substantially pass one part of the light spectrum and reflect the other part.

BRIEF DESCRIPTION OF THE DRAWINGS

Embodiments of the invention will now be described in greater detail with reference to the accompanying drawings in which

FIGS. 2 and 3 are diagrammatic exploded views of two embodiments of devices according to the invention. and FIG. 4 diagrammatically shows a projection display apparatus incorporating a device of the invention.

The Figures are diagrammatic and not to scale. Corresponding elements generally have the same reference numerals.

DESCRIPTION OF THE PREFERRED EMBODIMENTS

Figure 1:
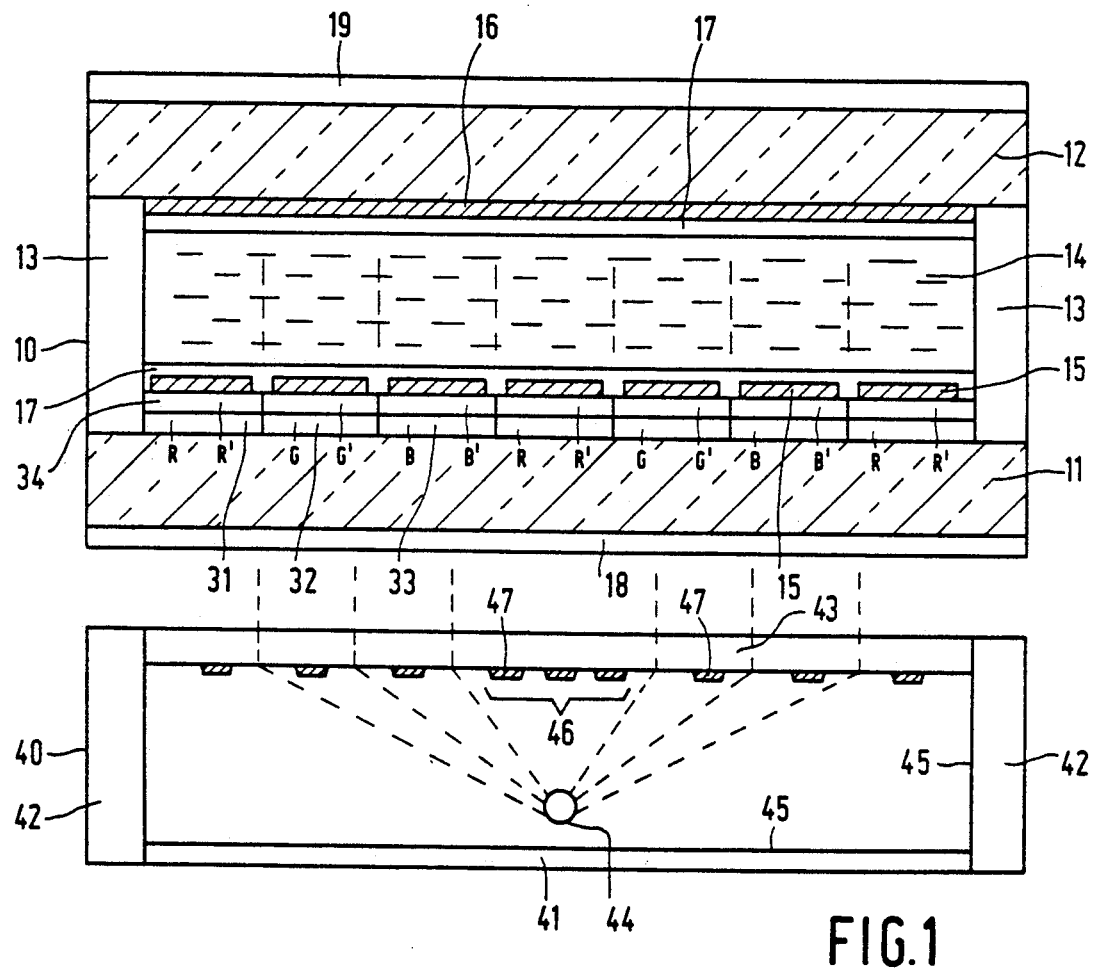
FIG. 1 is a diagrammatic cross-section of a display device according to the invention.

FIG. 1 is a diagrammatic cross-section of a display device according to the invention, comprising a display cell 10 and a light element 40.

The display cell 10 comprises two substantially parallel supporting plates 11, 12 of for example, glass or quartz which, together with peripheral seal 13, define a space accommodating a liquid crystal material 14. For driving separate pixels, the supporting plate 11 has, for example row electrodes 15, while the supporting plate 12 has column electrodes 16 perpendicularly crossing the row electrodes 15. The device can be driven both passively and actively; in the latter case switching elements such as diodes or transistors are arranged on at least one of the supporting plates. In the relevent example in which passive drive is used, the pixels 20 are defined by overlapping parts of the row and column electrodes at the area of the crossings. Dependent on the type of liquid crystal material used, the electrodes 15, 16 are coated with an orientation layer 17. Further-more, the device is provided in the conventional manner with a polarizer 18 and an analyzer 19.

The relevant picture display device is of the transmissive type and comprises a light element 40, in this example in the form of a hollow space defined by rear wall 41, side walls 42 and a front wall 43 which also functions as a diffusor for light emitted by one (or more) lamp(s) 44 or other light source(s) present in the light element 40.

According to the invention the rear wall 41 is reflective on its inner side 45, while the display cell 10, registering with the pixels 20, comprises dichroic mirrors 31, 32, 33.

The dichroic mirrors 31 are formed in such a way that they pass mainly red light and reflect the other light. In the same way the mirrors 32, 33 pass mainly green and blue light, respectively, while they reflect the other light. The reflected light passes through the supporting plate 11, the polarizer 18, and the diffusor 43.

According to the invention this light is reflected by the reflecting inner side 45 of wall 41 in the direction of the display cell 10, and comprises components from all mirrors 31, 32, 33 so that light with a wide spectrum is reflected. In this way the transmission factor of the dichroic mirrors 31, 32, 33 and hence the light output of the entire device is increased considerably.

In this embodiment, the display cell 10 is further provided with a composite colour filter 34 whose separate elements register with the mirrors 31, 32, 33. The colours (R', G', B') of the filter elements correspond to the colour passed by the associated mirrors (R, G, B). The use of such a colour filter has the advantage that it eliminates the viewing angle dependence introduced by the angle dependence of transmission of the dichroic mirrors. Moreover, the colour filter 34 shields the dichroic mirrors from ambient light, eliminating troublesome reflections.

The picture display device can be driven in a generally known manner by energizing the electrodes associated with the dichroic mirrors 31, 32 and 33, respectively, which correspond to red, green and blue pixels, via drive circuits to generate red, green and a blue sub-pictures, respectively.

FIGS. 2 and 3 diagrammatically show the operation of two different embodiments of the device. A liquid crystal cell (shown diagrammatically by layer 14 only) arranged between polarizer 18 and analyzer 19, is divided into pixels 20, registered with a pattern of dichroic mirrors 31, 32, 33 and, if desired (FIG. 3) a composite colour filter 34. The dichroic mirrors 31, 32, 33 pass red, green and blue light, respectively, and reflect the other light, which after having passed the polarizer 18 and the diffusor 43, is reflected by the reflective surface 45 and can again contribute to the transmission.

The diffusor 43 may be made of a light-transmissive material which is roughened on the side of the liquid crystal layer. Since light, which is reflected by the dichroic mirrors 31, 32, 33, is incident thereon and can also be reflected on the diffusor 43, it is preferably given a direction of polarization which is parallel to that of the polarizer 18. This leads to a maximum reflection. For the same reason the reflective surface 45, if consisting of a roughened material, is given a direction of polarization which is parallel to that of the polarizer 18.

FIG. 4 shows a projection display apparatus, in which light from a light element 40 with lamp 44 and reflective rear wall 41, is passed on to a display cell 10 by means of lamp-optical system 51, 52. The display cell 10 is provided at the lamp side with dichroic mirrors, in a manner similar to that shown in FIG. 1 (for example, in accordance with an RGB pattern). The image formed by the light which has been passed is imaged on a display screen 50 via a lens 53. Light reflected by the dichroic mirrors traverses a reverse light path and is reflected by the wall 41. In the same way as described with reference to FIG. 1, this light may again contribute to the formation of the image.

The device shown has a simpler structure than projection display devices in which the light is split into three sub-beams which are combined in an image plane after modulation.

In this example the light element comprises only a single lamp 44. Without special measures the light intensity at the area of the lamp 44 would be larger than elsewhere in the device. To prevent this, the side of the diffusor 43 facing the lamp 44 is coated, for example with parallel reflective metal strips 47 or other particles which have a larger density in the area 46 near the lamp 44. Here again, the optical axis of these materials is preferably parallel to the direction of polarization of the polarizer 18.

The invention is of course not limited to the embodiments shown. For example, the picture may be composed of sub-pictures of different colours. Completely different types of colour distribution over the pixels can also be used. The filter 34 may be arranged, for example on the other side of the liquid crystal. Moreover, there are many variations for realizing the light element.

I claim:

1. A color display device, comprising a display cell, the display cell comprising an electro-optical medium between two transparent, parallel supporting plates, a pattern of pixels provided on the plates, said device also comprising a light element including a light source, characterized in that the light element is capable of emitting a light spectrum and includes a reflecting element, and in that the cell comprises a pattern of dichroic mirrors in register with the pixels, which mirrors substantially pass one color of the light spectrum associated with corresponding pixels and substantially reflect the other colors of the spectrum in the direction of the reflecting element, whereby the light is reflected back in the direction of the pixels.

2. A display device as claimed in claim 1, characterized in that the reflecting element is located on the inner side of the rear wall of the light element.

3. A display device as claimed in claim 2, characterized in that the display cell includes a polarizer on the side closes to the light element and the reflecting element is coated with a material whose optical axis is parallel to the direction of polarization of the polarizer.

4. A display device as claimed in claim 3, characterized in that the light element also comprises a diffuser which comprises a layer of reflective metal particles whose optical axes are substantially parallel to the direction of polarization of the polarizer.

5. A display device as claimed in claim 4, characterized in that the metal particles have a higher surface density at an area near the light source in the light element.

6. A display device as claimed in claim 1, characterized in that the device comprises a composite color filter which is divided into filter elements in register with the dichroic mirrors and the pixels, the colors passed by the filter elements of the color filter corresponding to the colors passed by the associated dichroic mirrors.

7. A display device as claimed in claim 6, characterized in that the reflecting element is located on the inner side of the rear wall of the light element.

8. A display device as claimed in claim 1, characterized in that the display device comprises drive circuits which generate respective sub-pictures for each color of the light spectrum associated with corresponding pixels.

9. A display device as claimed in claim 8, characterized in that the reflecting element is located on the inner side of the rear wall of the light element.

10. A display device as claim in claim 8, characterized in that the colors passed by the dichroic mirrors are red, green and blue.

11. A display device as claimed in claim 10, characterized in that the reflecting element is located on the inner side of the rear wall of the light element.

12. A display device as claimed in claim 8, characterized in that the device comprises a color filter which is divided into filter elements registering with the dichroic mirrors and the pixels, the colors of filter elements of the color filter corresponding to the colors passed by the associated dichroic mirrors.

13. A display device as claimed in claim 12, characterized in that the colors are red, green and blue.

14. An apparatus for color projection display, characterized in that the apparatus comprises a color display device as claimed in claim 1 and optical means for projecting an image generated in the display cell onto a projection plane.

* * * * *